United States Patent
Geissinger et al.

(10) Patent No.: US 10,769,214 B2
(45) Date of Patent: Sep. 8, 2020

(54) ENCODING AND DECODING FILES FOR A DOCUMENT STORE

(71) Applicant: SAP SE, Walldorf (DE)

(72) Inventors: Steffen Geissinger, Wiesloch (DE); Christian Bensberg, Heidelberg (DE)

(*) Notice: Subject to any disclaimer, the term of this patent is extended or adjusted under 35 U.S.C. 154(b) by 312 days.

(21) Appl. No.: 15/344,187

(22) Filed: Nov. 4, 2016

(65) Prior Publication Data

US 2018/0129655 A1 May 10, 2018

(51) Int. Cl.
| | |
|---|---|
| G06F 16/20 | (2019.01) |
| G06F 16/93 | (2019.01) |
| G06F 16/951 | (2019.01) |
| G06F 16/9038 | (2019.01) |
| G06F 16/28 | (2019.01) |
| G06F 16/245 | (2019.01) |
| G06F 16/22 | (2019.01) |

(52) U.S. Cl.
CPC ........ G06F 16/93 (2019.01); G06F 16/2228 (2019.01); G06F 16/245 (2019.01); G06F 16/28 (2019.01); G06F 16/9038 (2019.01); G06F 16/951 (2019.01)

(58) Field of Classification Search
None
See application file for complete search history.

(56) References Cited

U.S. PATENT DOCUMENTS

| | | | | |
|---|---|---|---|---|
| 9,973,597 | B1* | 5/2018 | Karppanen | H04L 67/1095 |
| 2002/0152219 | A1* | 10/2002 | Singh | H04L 69/04 |
| 2005/0015514 | A1* | 1/2005 | Garakani | H03M 7/46 |
| | | | | 709/247 |
| 2008/0168345 | A1* | 7/2008 | Becker | G06F 17/30896 |
| | | | | 715/242 |
| 2010/0328115 | A1* | 12/2010 | Binnig | G06F 16/24561 |
| | | | | 341/51 |
| 2013/0262704 | A1* | 10/2013 | Jain | G06F 17/30902 |
| | | | | 709/247 |
| 2014/0006244 | A1* | 1/2014 | Crowley | G06Q 40/04 |
| | | | | 705/37 |

* cited by examiner

*Primary Examiner* — Jau Shya Meng
(74) *Attorney, Agent, or Firm* — Mintz Levin Cohn Ferris Glovsky and Popeo, P.C.

(57) ABSTRACT

A system for encoding and/or decoding documents for a document store is provided. In some implementations, the system performs operations comprising receiving a query related to at least a portion of a plurality of stored documents and retrieving one or more documents from the plurality of stored documents based on the query. The operations can further include generating a client-side dictionary including a plurality of definitions corresponding to a plurality of parameters (e.g., reference values for corresponding parameters) from the plurality of stored documents. The operations can also include providing the client-side dictionary and the one or more documents in response to the query. One or more of the operations can be implemented by a database server. Related systems, methods, and articles of manufacture are also described.

17 Claims, 12 Drawing Sheets

124

| | | Slice 1 | Slice 2 |
|---|---|---|---|
| 730 | 0 | id | |
| | 1 | name | |
| | 2 | age | min: 4000 / max: 8000 → min: 7000 / max: 11000 |
| | 3 | joinDate | min: 2014-01-05 / max: 2015-04-05 → min: 2015-04-04 / max: 2016-05-06 |
| | 4 | address | |
| | 5 | street | |
| | 6 | city | |

320

Slice 1 (710):
{ 0: 4711
  3: 2014-04-01
  ... }
{ 0: 4712
  3: 2014-04-01
  ... }
{ 0: 4714
  3: 2014-04-01
  ... }

Slice 2 (720):
{ 0: 9055
  3: 2016-05-01
  ... }
{ 0: 9056
  3: 2016-05-01
  ... }
{ 0: 9059
  3: 2016-05-01
  ... }

FIG. 7

ENCODING AND DECODING FILES FOR A DOCUMENT STORE

TECHNICAL FIELD

The subject matter described herein relates to database management, and more particularly to systems and methods for encoding and decoding files for (e.g., retrieved from and/or stored in) a document store.

BACKGROUND

Software applications and/or database systems may be hosted and/or accessed through a network. Remote database systems can be centralized through the use of one or more servers, which can offload processing and/or storage from smaller client devices. However, as the number of client devices accessing the one or more servers increases, the greater the processing requirements demanded from the one or more servers. Therefore, balancing the amount of processing between clients and servers may be desirable.

SUMMARY

In one aspect, a method, computer program product and system are provided. The method, computer program product and system execute operations for managing encoding and/or decoding of files in a document store. In one variation, the operations can include receiving, at a database server, a query related to at least a portion of a plurality of stored documents and/or retrieving, by the database server and based on the query, one or more documents from the plurality of stored documents. The operations can further include generating, by the database server, a client-side dictionary for the one or more documents, wherein the client-side dictionary includes a plurality of definitions corresponding to a plurality of parameters from the plurality of stored documents, and wherein each of the plurality of definitions includes a reference value and a corresponding parameter from the plurality of parameters. The operations can also include providing, by the database server, the client-side dictionary and the one or more documents in response to the query. One or more of the operations can occur at or by a database server.

In some variations the plurality of stored documents can be encoded based on the client-side dictionary, wherein the plurality of stored documents are encoded to include a plurality of reference values defined in the client-side dictionary in place of at least a portion of the plurality of parameters. In some implementations, the operations can further include receiving, at the database server, a plurality of documents to be stored in a database and/or generating, at a database server, at least a portion of a server-side dictionary based on the plurality of received documents. In related aspects, the operations can also include encoding, at the database server, the plurality of received documents based on the server-side dictionary to generate a plurality of encoded documents, wherein the plurality of encoded documents are encoded to include a plurality of reference values defined in the server-side dictionary in place of at least a portion of the plurality of parameters. In some implementations, the plurality of encoded documents can be stored in a document storage collection of the database and/or the client-side dictionary can be generated based on the server-side dictionary.

In some variations the operations can further include determining, by the database server, whether a first aggregate size of the client-side dictionary and the one or more documents is greater than a second aggregate size of uncompressed versions of the one or more documents. In related aspects, the operations can further include providing, by the database server, the uncompressed versions of the one or more documents in response to the query when the first aggregate size is greater than the second aggregate size. In some variations the operations can further include determining, by the database server, whether a first aggregate size of the client-side dictionary and the one or more documents is greater than a second aggregate size of uncompressed versions of the one or more documents. In related aspects, providing the client-side dictionary and the one or more documents in response to the query might only occur when the first aggregate size is not greater than the second aggregate size.

In some aspects, providing the client-side dictionary and/or the one or more documents includes providing the client-side dictionary and/or the one or more documents over a network, to a user device which initiated the query. In some aspects, the plurality of stored documents can be stored in a document storage collection. In various implementations, the plurality of stored documents can binary representations of JavaScript Object Notation (JSON) documents (e.g., PaceJSON documents).

Implementations of the current subject matter can include, but are not limited to, systems and methods consistent with the present description, including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 7 is a functional block diagram of a portion of the slices of documents and the dictionary, in accordance with some embodiments;

When practical, similar reference numbers denote similar structures, features, or elements.

DETAILED DESCRIPTION

File storage and/or processing systems can be centralized through the use of one or more servers, which can offload processing and/or storage from client devices accessing the one or more servers. However, although servers may make it easier and/or more convenient for users to store/access data from virtually anywhere, servers may still only have a limited processing and/or storage capacity (e.g., a server or set of servers may only be able to process so many things at one time without degrading performance). Therefore, owners/operators of servers may wish to offload certain processing procedures to the client devices which access the servers. Thus, at least some of the subject matter described herein relates to systems and methods for managing, encoding, and/or decoding of files for a document store.

As used herein, files may refer to electronic documents, media, and/or any other type of object that stores information, data, commands, and/or the like. However, where the term "document" is used, additional or alternative file types may be used along with or in place of documents (e.g., text-based files, code, and/or the like).

Figure 1:
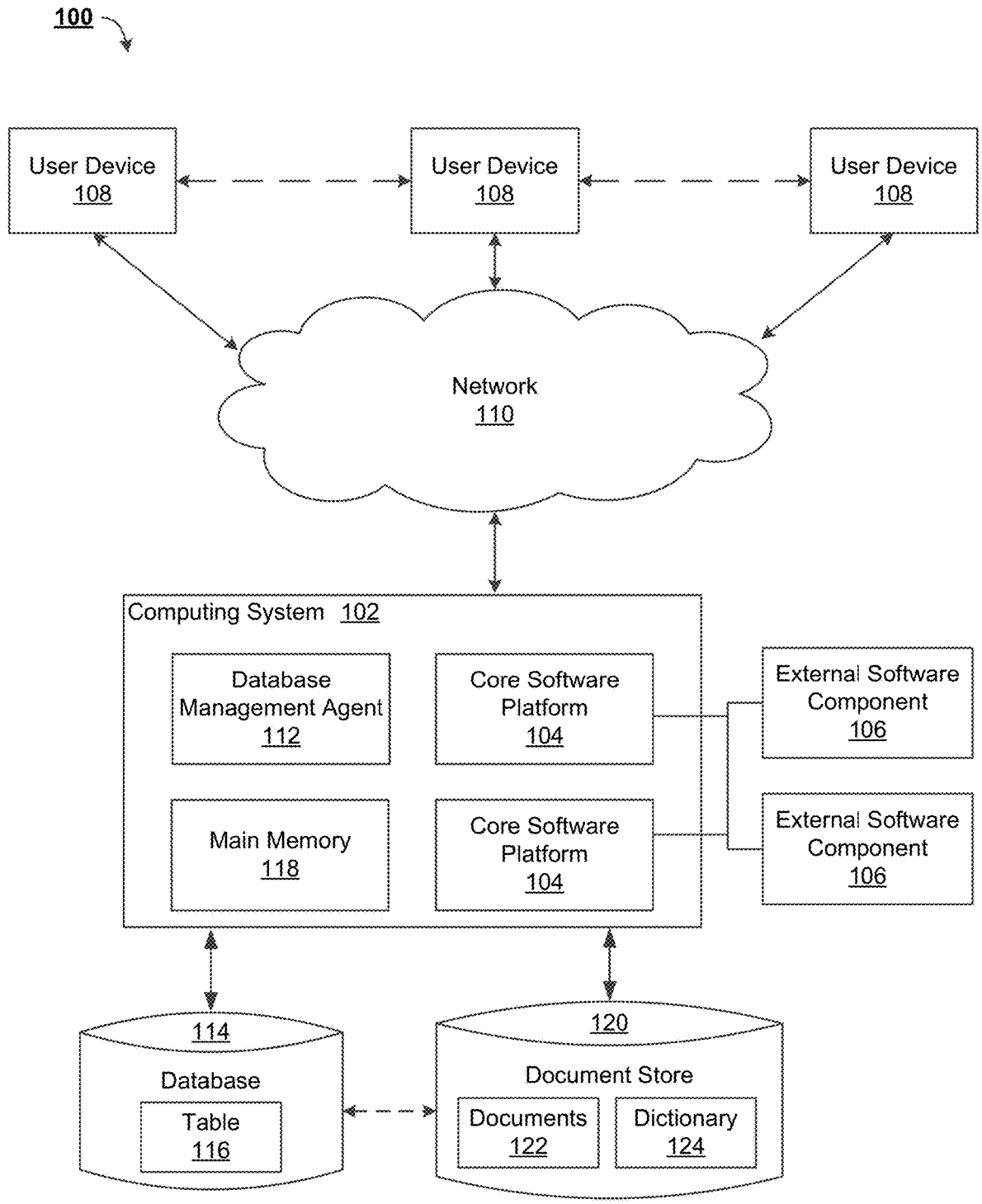
FIG. 1 is a functional block diagram illustrating a system in which features consistent with implementations of the current subject matter may be implemented.

FIG. 1 is a diagram of a system 100 that can implement one or more features consistent with the current subject matter. A computing system 102 can include one or more core software platform modules 104 providing one or more features of a high-level programming software system or other software that includes database management features. The computing system can also aggregate or otherwise provide a gateway via which users can access functionality provided by one or more external software components 106. One or more user devices 108 can access the computing system, either via a direct connection, a local terminal, or over a network 110 (e.g. a local area network, a wide area network, a wireless network, the Internet, or the like). Examples of the user devices 108 include personal computers, desktop computers, laptops, workstations, cell phones, digital media devices, smart phones, smart watches, PDAs (personal digital assistants), tablets, hardware/software servers, and/or the like.

A database management agent 112 or other similar software/hardware can access a database layer, such as database 114, which includes at least one table 116, which can in turn include at least one column. The database table 116 can store any kind of data, potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario, business process, and/or the like.

Similarly, the database management agent 112 or other similar software/hardware can access a document store 120 (also referred to herein as "document storage") that includes at least one document 122 and/or one or more dictionaries 124. The documents 122 can store any kind of documents, including JSON (JavaScript Object Notation) documents, PJSON (PaceJSON) documents, other documents, code, files, and/or the like. In some aspects, a PJSON document can be a binary representation of a JSON document. The one or more dictionaries 124 can include reference values used for the encoding and/or decoding of the documents 122, as described herein. In some aspects, encoding and decoding can refer to compression and/or decompression of the documents 122.

The database management agent 112 can implement one or more of the features of implementations discussed herein. For example, the database management agent 112 or other comparable functionality can be configured to load a database table 116, document 122, dictionary, and/or the like into the main memory 118. The database management agent 112 can be configured to load the information from the database 114 and/or document store 120 to the main memory 118 in response to receipt of a query instantiated by a user or computer system through one or more user devices 108, external software components 106, core software platforms 104, or the like. In some embodiments, all (or substantially all) of the operational data of the database 114 and/or the document store 120 can reside in-memory (e.g., in random-access memory (RAM)).

At least a portion of the illustrated system 100 may be implemented as a cloud-based database management system (e.g., not including the user devices 108). In some aspects, a cloud-based database management system may be a hardware and/or software system for receiving, handling, optimizing, and/or executing database 114 or document store 120 queries. In some aspects, the database 114 can be a structured, organized collection of data, such as schemas, tables, queries, reports, views, and/or the like, which may be processed for information. In some aspects, the document store 120 can be an unstructured (e.g., partially structured), collection of documents, such as JSON documents, PJSON documents, other documents, files, code, and/or the like, which may be processed for information.

The database 114 and/or document store 120 may be physically stored in a hardware server or across a plurality of hardware servers. As illustrated, in some embodiments, communication may occur between the database 114 and the document store 120. In some aspects, a cloud-based database management system may be a hardware and/or software system that interacts with a database, document store, users, and/or other software applications for defining, creating, and/or updating data, for receiving, handling, optimizing, and/or executing database/document store queries, and/or for running applications which utilize a database/document store. Although the database 114 and document store 120 are illustrated as being separate and, at times, described as being separate, in various embodiments, at least a portion of the database 114 and the documents store 120 can be combined. In some aspects, the document store 120 can be referred to as a database.

In some aspects, documents stored in the memory 118 and/or the document store 120 may be encoded. In various implementations, the memory 118 and/or the document store 120 may contain one or more dictionaries for encoding and/or decoding the documents stored in the memory 118, the document store 120, and/or otherwise communicated via the network 110. For example, during runtime of an application, the database management agent 112 may need to access encoded documents in order to run the application, and may access the document store 120 in order to obtain the relevant document(s). As stored can become constrained at times and/or a larger amount of stored data can decrease processing efficiency, conservation of storage can increase operating efficiencies. As such, systems and methods for doing so are described herein.

In some aspects, a user (e.g., a user of the user device 108) may request a document stored within the memory 118 or the document store 120, and/or provide a document for storage at the memory 118 or the document store 120, which can require communications over the network 110. As network communications can become constrained/limited at times, conservation network resources can provide increased throughput. As such, systems and methods for doing so are described herein. The database 114 may be a column store database. Computing system 102 may be configured to perform OLTP (online transaction processing) and/or OLAP (online analytical processing), which can include complex analytics and tasks.

Figure 2:
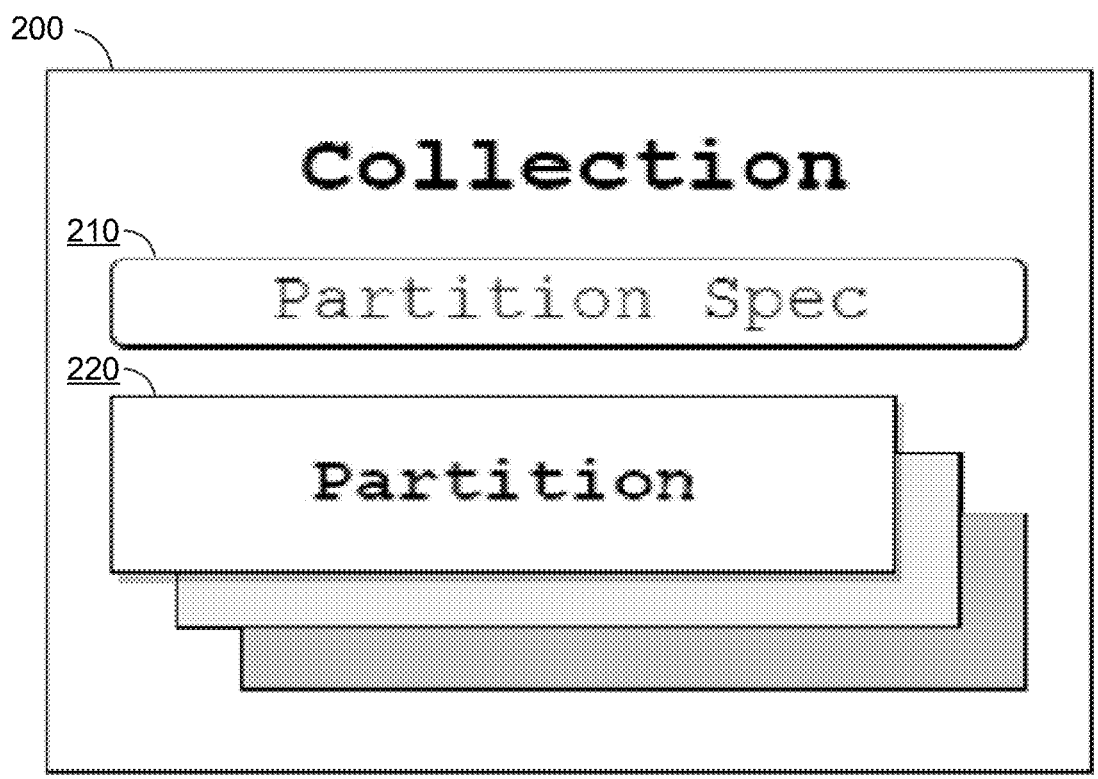
FIG. 2 is a functional block diagram of a collection of documents, which forms a portion of the document store of FIG. 1, in accordance with some embodiments.

FIG. 2 is a functional block diagram of a collection 200 of documents, which forms a portion of the document store 120 of FIG. 1, in accordance with some embodiments. The illustrated collection 200 can be one of a plurality of collections used to store the documents 122 of the document store. As illustrated, the collection 200 can include a partition specification 210 and/or one or more partitions 220. In some aspects, the partitions 220 can be regarded as data fragments in memory, which can be organized on a persistence layer level. In some implementations, the partitions 220 can be divided among a plurality of physical devices and/or can be organized in a manner that speeds up access to more frequently accessed documents. In some aspects, a partition from the plurality of partitions 220 can include hundreds of gigabytes worth of documents. In various embodiments, the partition specification 210 can provide information related to the plurality of partitions 220 which are part of the collection.

Figure 3:
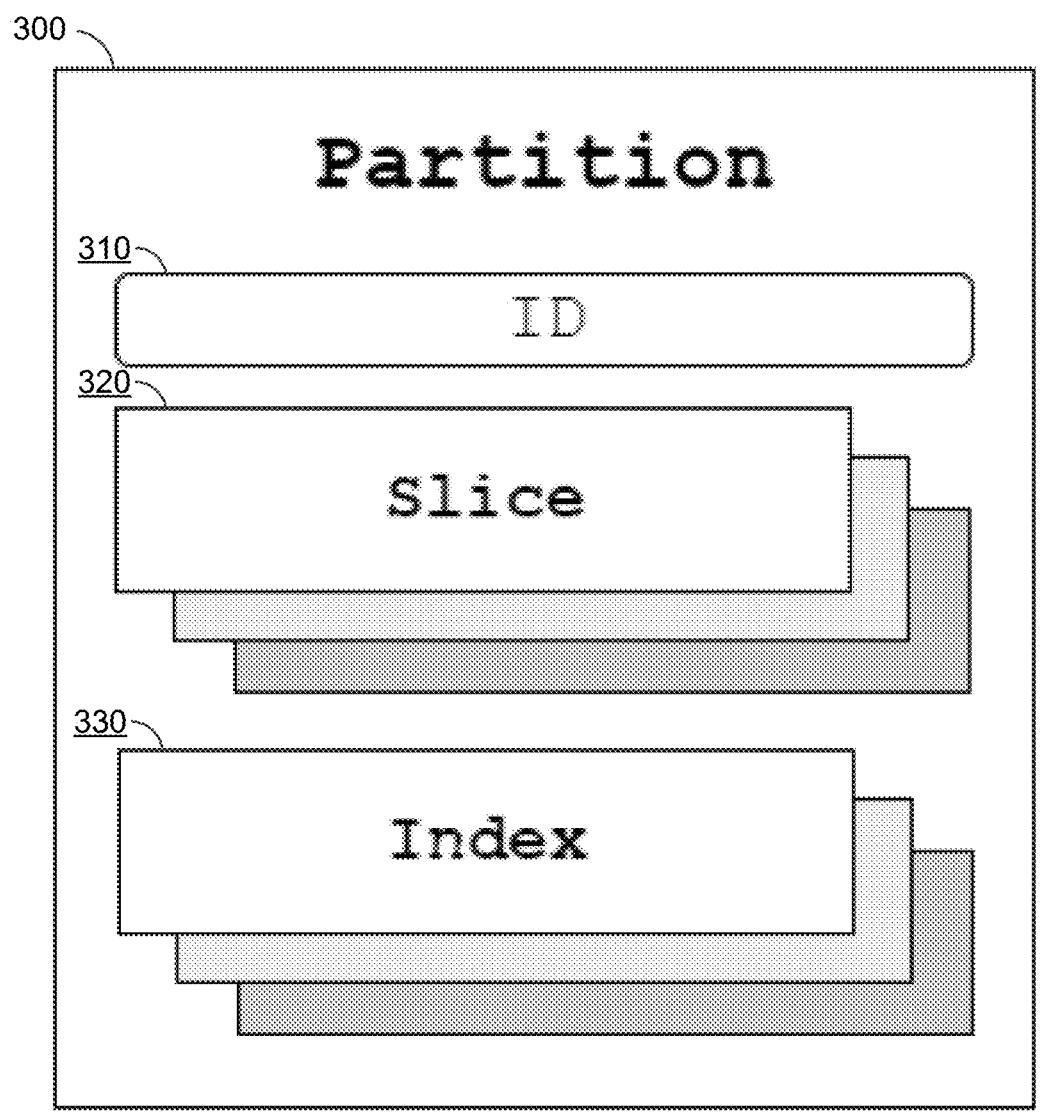
FIG. 3 is a functional block diagram of a partition of documents, which forms a portion of the collection of FIG. 2, in accordance with some embodiments.

FIG. 3 is a functional block diagram of a partition 300 of documents, which forms a portion of the collection 200 of FIG. 2, in accordance with some embodiments. The illustrated partition 300 can be one of the plurality of partitions 220 in the collection 200. As illustrated, the partition 300 can include an identifier 310 which identifies the partition 300, a plurality of slices 320, and/or a plurality of indices 330. In some embodiments, a slice from the plurality of slices 320 can include a fixed maximum memory size, such as 32 MB of documents, for example. The plurality of indices 330 can provide information related to the documents contained within the partition 300, and specifically may provide information regarding the location of each document among the plurality of slices 320 of the partition 300.

Figure 4:
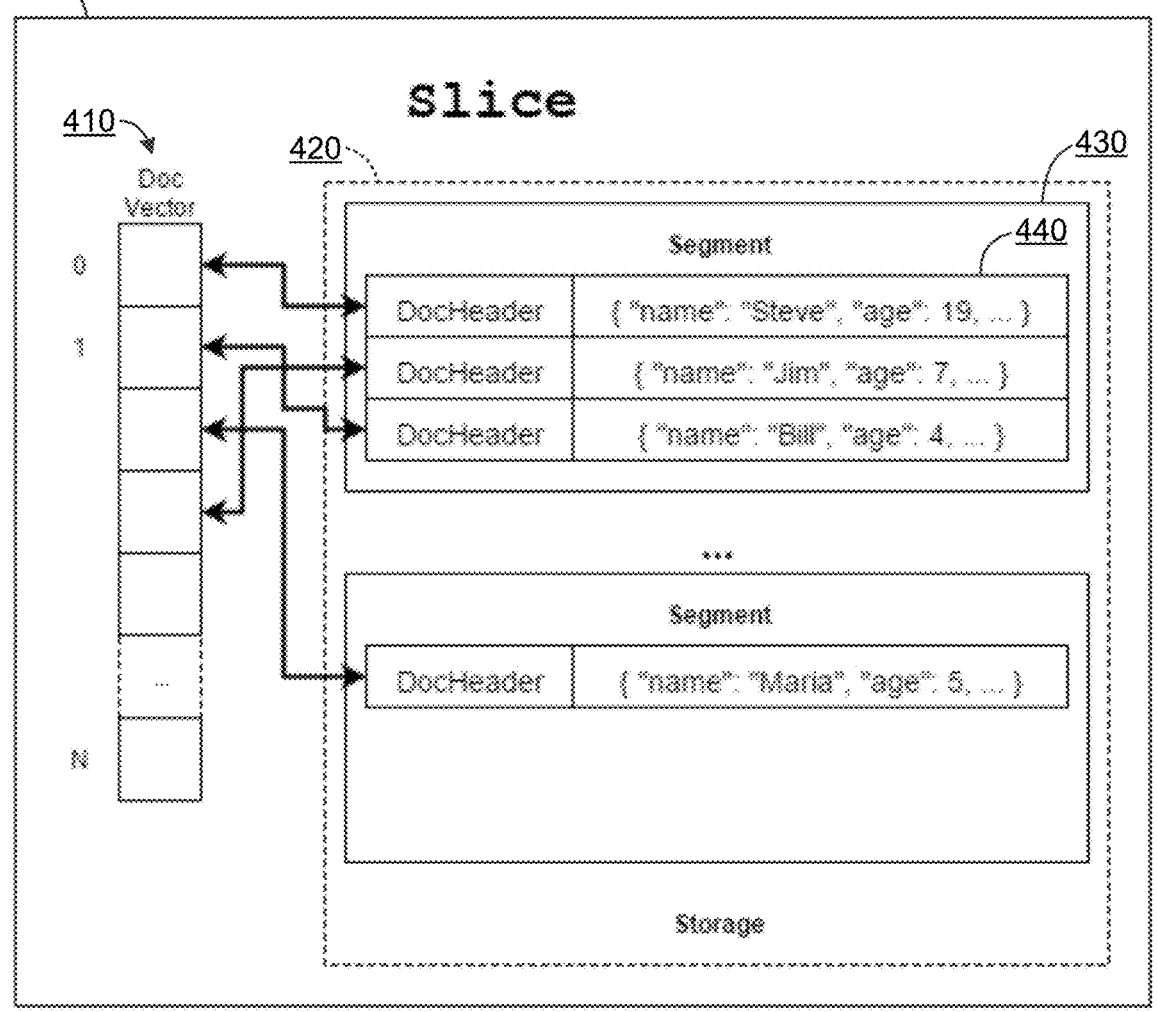
FIG. 4 is a functional block diagram of a slice of documents, which forms a portion of the partition of documents of FIG. 3, in accordance with some embodiments.

FIG. 4 is a functional block diagram of a slice 400 of documents, which forms a portion of the partition 300 of files of FIG. 3, in accordance with some embodiments. The illustrated slice 400 can be one of the plurality of slices 320 in the partition 300. As illustrated, the slice 400 can include a document vector 410 and/or a storage 420 portion. The storage portion 420 can include one or more segments 430 of documents 440. In some aspects, the document vector 410 can include information regarding the location of the documents 440 within the segments 430 of the slice 400 of documents. In some aspects, the document vector 410 can include a pointer to the corresponding document 440 header, which can be used to access, process, and/or retrieve the document 440.

In some aspects, a document header can contain metadata about the actual document 440. For example, the document header can include a pointer to an older version, a pointer to a newer version, a creation timestamp, a tombstone flag (e.g., when pointer(s) to older version(s) have been deleted), and/or the like.

Figure 5:
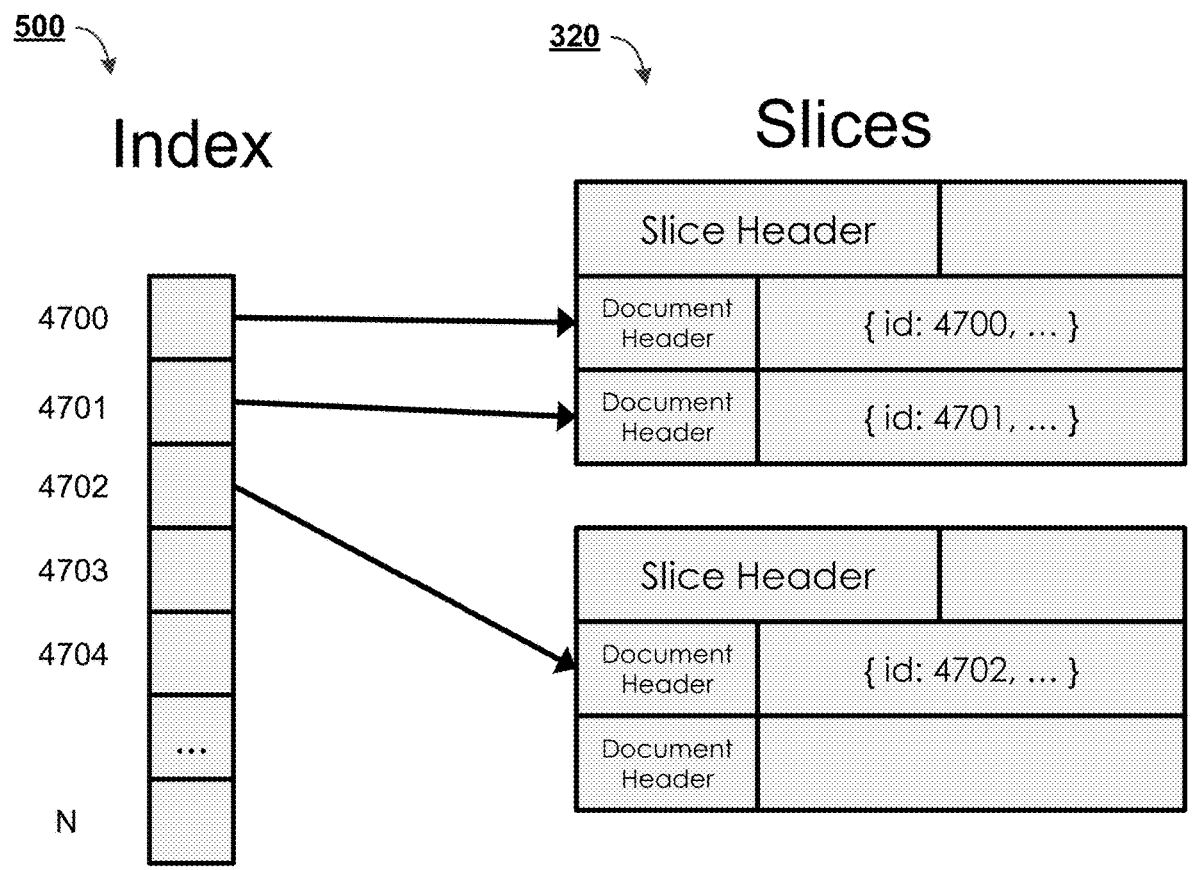
FIG. 5 is a functional block diagram of indices corresponding to a portion of the plurality of slices of documents, in accordance with some embodiments.

FIG. 5 is a functional block diagram of indices 500 corresponding to a portion of the plurality of slices 320, in accordance with some embodiments. In some aspects, the indices 500 can correspond to the document vector 410. However, in other aspects, the indices 500 can be external to the slices 320, and can include pointers to documents stored in multiple slices 320, and/or may be based on an identifier (e.g., "id: 4700") of at least a portion of the documents 122 stored in the document store 120. Thus indices can be used on a per-partition and/or a per-slice basis. In some aspects, the indices 500 can be updated based on insertion, updating, and/or deletion of documents from the document store 120 (e.g., from the slices 320). Thus, the indices 500 can be kept up to date.

Figure 6:
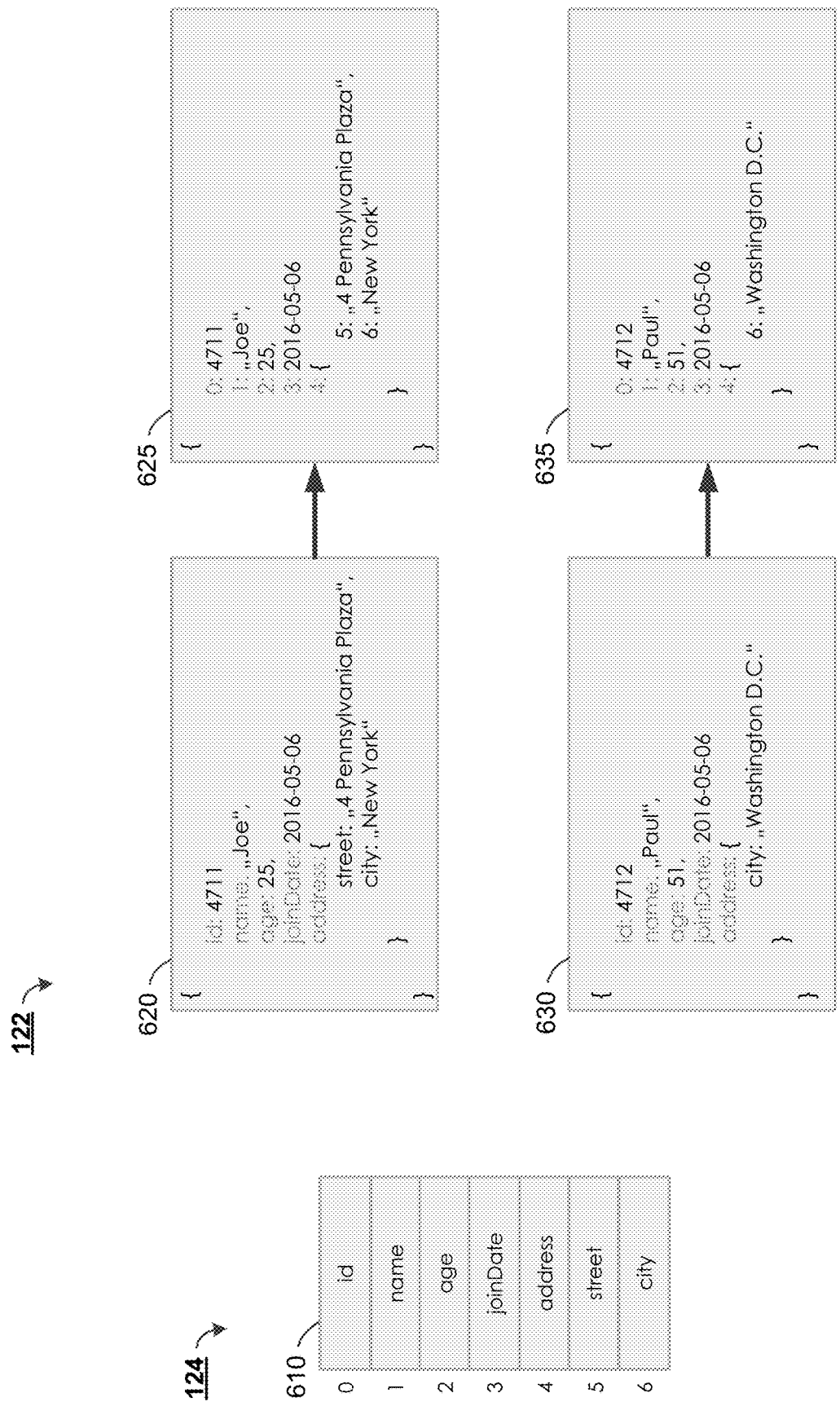
FIG. 6 is a functional block diagram of a portion of documents and the dictionary of the document store, in accordance with some embodiments.

FIG. 6 is a functional block diagram of one or more documents 122 and the dictionary 124 of the document store 120, in accordance with some embodiments. In the illustrated example, the dictionary 124 can include dictionary 610, and the documents 122 can contain documents 620, 625, 630, and/or 635. In some embodiments, the documents 620, 625, 630, and/or 635 can be JSON or PJSON documents. As illustrated, documents 620 and 630 can have some fields which are common to each other. Specifically, each of the documents 620 and 630 may have an id field, a name field, an age field, a joinDate field, an address field, and/or a city field. For each of the fields in the documents 620 and 630, a corresponding entry in the dictionary 610 can be added, where each entry contains a value and a corresponding text for the field. For example, as illustrated, the dictionary 610 includes entries "0: id", "1: name", "2: age", "3: joinDate", "4: address", "5: street", and "6: city". The dictionary 610 and documents 620-635 are simply for illustration, as dictionaries with any number of entries and/or documents with different contents may be used in other embodiments.

Using the entries of the dictionary 610, document 620 can be converted (e.g., encoded/compressed) into document 625. Similarly, document 630 can be converted (e.g., encoded/compressed) into document 635. Documents 625 and 635, along with the dictionary 610, might be stored in the document store 120 instead of documents 620 and 630. Doing so can save space in memory, as less characters are required to store the encoded documents 625 and 635 with the dictionary 610, compared to the characters required to store the decoded documents 620 and 630. As the number of documents 122 stored in the document store 120 increases, the potential for saving space will increase.

In various embodiments, when a user device 108 requests one or more documents from the documents store 120, the computing system 102 may need to decode the one or more documents before transmitting them to the user device 108. For example, if the user device 108 requests documents 625 and 635 stored in the document store, the computing system may have to first convert (e.g., decode/decompress) document 625 into document 620 and document 635 into document 630, and then transmit the decoded documents 620 and 630 over the network, to the requesting user device 108. This can occur due to the fact that the dictionary 610 is created and/or stored on the server side (e.g., computing system 102), and might not be accessible on the client side (e.g., via the client devices 108). As the number of requests for documents from the document store 120 increases, the time/resources demanded from the computing system 102 also increases. Thus, it can be advantageous to offload at least some of the processing and/or memory usage from the computing system 102 to the user devices 108.

In some embodiments, when a user device 108 requests one or more documents from the document store 120, the computing system 102 can transmit the one or more documents, in their encoded form, along with at least a portion of the dictionary 124, back to the requesting user device 108. The user device 108 can then decode the documents based on the dictionary. In some aspects, the dictionary 124 may store entries in a manner that associates the definitions with the relevant document(s) (e.g., documents which contain the entry). In some embodiments, the computing system 102 may separately transmit at least a portion of the dictionary to the user device 108 as part of a routine and/or maintenance procedure. In some embodiments, the dictionary can be sent ahead of time. In related embodiments, differences between a dictionary that was previously transmitted to a user device 108 and a current version of the dictionary 124 (or a portion thereof) can be transmitted to the user device 108 (e.g., along with requested documents or as a separate update). In various aspects, the dictionary (or a portion thereof) can be compressed according to one or more compression technique before it is transmitted. In various embodiments, the computing system 102 may first determine whether transmitting the requested documents along with the at least a portion of the dictionary will require a larger transmission, and based on the determination, the computing system 102 can either decode the documents itself or transmit the encoded documents along with the dictionary.

In certain embodiments, a user device 108 can request documents from the document store 120 based on one or more database/document store queries, such as a SQL query and/or the like. In some aspects, a query may return more documents than the user device 108 desires. Accordingly, the user device 108 might only decode a portion of the documents it receives from the computing apparatus 102. If the computing apparatus 102 is the one doing the decoding instead, then all of the requested/queried documents will need to be decoded before being provided to the user device 108, which can result in decoding of unnecessary documents. Performing the procedures described herein can help to reduce network bandwidth by requiring less data to be transmitted.

In some aspects, an entry in the dictionary 610 might only be created for fields which are common to at least two documents. Otherwise, additional processing and storage might be required if several dictionary entries are created for fields which are only present in one document. Similarly, the smaller the size of the dictionary, the less time and/or processing power needed to decode the documents (e.g., encoded document 625) or to transmit the dictionary 610 to the user device 108.

In some embodiments, the user device 108 may actually be another apparatus similar to the computing apparatus 102 of FIG. 1 (e.g., another server). Similarly, additional computing apparatuses 102 can be interconnected to form a multi-host architecture, which can be used to store more data and/or utilize additional computing power. In accordance with these embodiments, a first computing apparatus 102 can request a large amount of data from a second computing apparatus 102 (and so forth), where providing encoded documents with a dictionary can be very advantageous.

In other embodiments, the user devices 108 and/or the computing apparatus 102 can be set up according to an IoT (Internet of things) setup. In accordance with these embodiments, at least a portion of the user devices 108 can have their own document store 120 and/or the computing apparatus 102 may not be present or may otherwise have less/ different components or a reduced/different role. For example, the user devices 108 can have independent/stand-alone document store 120 instances, which can be synchronized (e.g., periodically and/or upon the occurrence of an event) with a central installation in a data center (e.g., via the computing apparatus 102). In some embodiments, where PJSON or JSON is used for the format of the documents stored, the document store 120 instances (e.g., the user devices 108) may communicate with each other in their native persistence format. Doing so can speed up data processing and export/import of data.

In some aspects, signatures can be used to establish trust with other document store 120 instances that are not centrally controlled, which can help to avoid the import of malicious files and/or corrupt data. In some embodiments, a versioning protocol can be utilized for the binary data. PJSON can be extended with libraries, tools, viewers, and/or the like so that humans may read PJSON documents like plain text JSON, and/or integrate them into other programs.

As noted above, documents 122 in the document store 120 can be retrieved, stored, created, and/or the like based on queries (e.g., SQL queries or the like). However, as the documents 122 might be stored in an unstructured/partially structured manner, locating relevant documents and/or contents within the document store 120 can be challenging. As such, methods for storage of documents and/or handling of queries are described. For example, FIG. 7 is a functional block diagram of a portion of the slices 320 of documents and the dictionary 124, in accordance with some embodiments. As illustrated, the plurality of slices 320 can include slices 710 and 720, and the dictionary can include dictionary 730.

Based upon processing the slices 710 and 720, it may be determined that the range of id values for the slice 710 is "min: 4000" and "max: 8000", and that the range of id values for the slice 720 is "min: 7000" and "max: 10000". Similarly, it may be determined that the range of joinDate values for the slice 710 is "min: 2014-01-05" and "max: 2015-04-05", and that the range of joinDate values for the slice 720 is "min: 2015-04-04" and "max: 2016-05-06". The determined ranges of values may be stored within the dictionary 610. For example, the determined ranges can be stored alongside the corresponding field. In this regard, the dictionary 730 can form a table, which can be searched based on a field identifier (e.g., 0, 1, 2, etc.), a field description (e.g., name, age, etc.), slice identifier (e.g., slice 1, slice 2, etc.), field value (e.g., "id=5000"), field value range (e.g., "id>5000 AND id<6000"), and/or the like.

In some aspects, the ranges of documents can be rounded up or down, based on the identified values. For example, the lowest id value for a document present within the slice 710 might be "4711", but the minimum value stored in the dictionary 730 for the slice 710 might be rounded down to "4000". The stored maximum can be similarly rounded up. Although this may cause some overlap among slices 320, making the ranges over-inclusive may avoid overlooking slices 320 which actually contain relevant data (e.g., when one or more of the slices 320 are updated but the range stored in the dictionary 730 does not capture all of the updated values).

When a query is received for one or more documents stored at the document store 120, the computing apparatus 102 can search the dictionary 124 to quickly identify location(s) of documents matching the query parameters. Providing the ranges in a table organized in this manner can decrease processing time/resources required to respond to a query for documents. When executing a query and searching for relevant slices 320 in this manner, ignoring slices 320 can be referred to as pruning of the slices 320. In some aspects, pruning can occur as a pre-processing procedure. For example, based on a query, the computing apparatus 102 can first decide which slices 320 to prune. After pruning these slices 320, the computing apparatus 102 can further utilize the remaining slices 320 to actually execute the query. Pre-processing in this manner can save additional processing time/resources.

Figure 8:
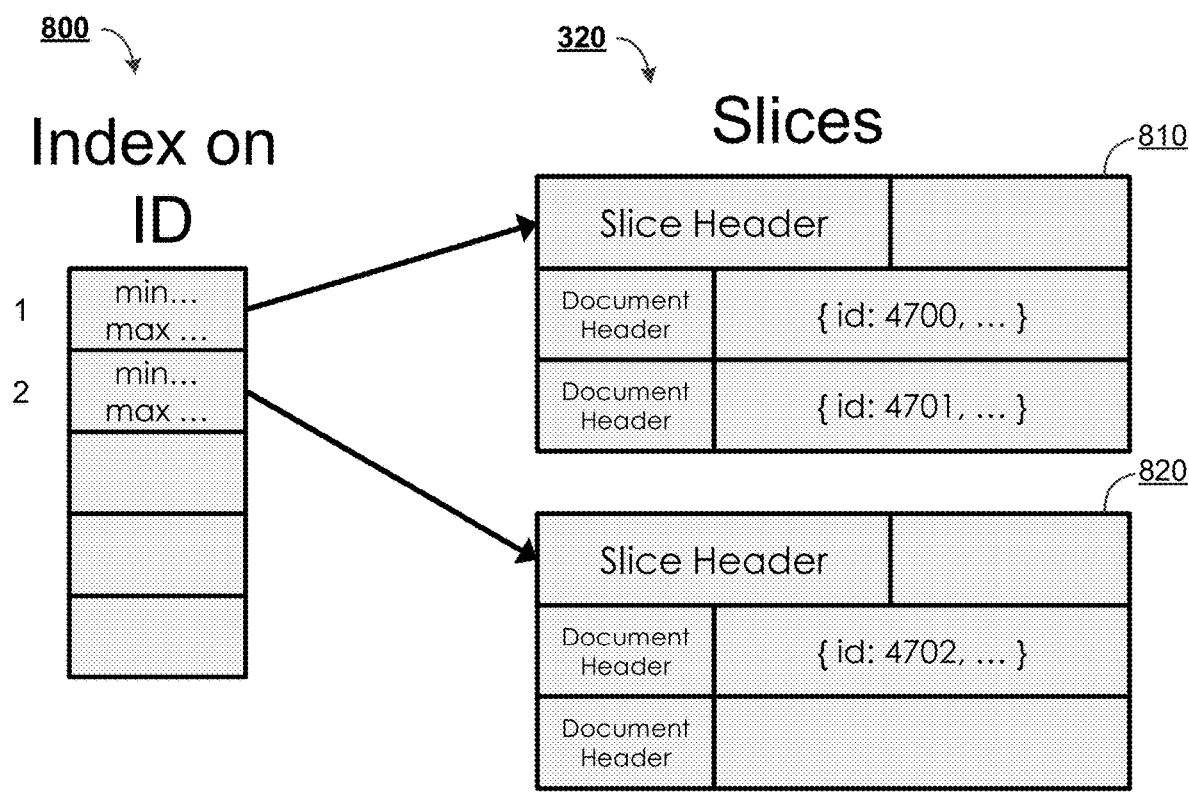
FIG. 8 is another functional block diagram of indices corresponding to a portion of the slices of documents, in accordance with some embodiments.

FIG. 8 is another functional block diagram of indices 800 corresponding to a portion of the slices 320 of documents, in accordance with some embodiments. In some aspects, the indices 800 can correspond to the indices 500 of FIG. 5. However, in other aspects, the indices 800 can be modified to include/refer to ranges, and/or to point to slice headers instead of document headers. In some aspects, a slice header can include metadata for the corresponding slice 320. For example, similar to above, the computing system 102 can determine that the range of id values for the slice 810 is "min: 4700" and "max: 4701", and that the range of id values for the slice 820 is "min: 4702" and "max: 4702". These ranges can be stored in/along with the indices 800, and may be referenced during processing of queries (e.g., for pruning and/or execution of the query). Although "id" ranges are illustrated and described, other fields and/or field values are possible. Other modifications to this procedure may be made, as described herein (e.g., rounding minimums and maximums).

In some aspects, the indices 800 (e.g., the corresponding ranges and/or pointers) can be updated based on insertion, updating, and/or deletion of documents from the document store 120 (e.g., from the slices 320). Similarly, the indices 800 can be updated based on insertion, updating, and/or deletion of slices 320. Thus, the indices 800 can be kept up to date.

Figure 9:
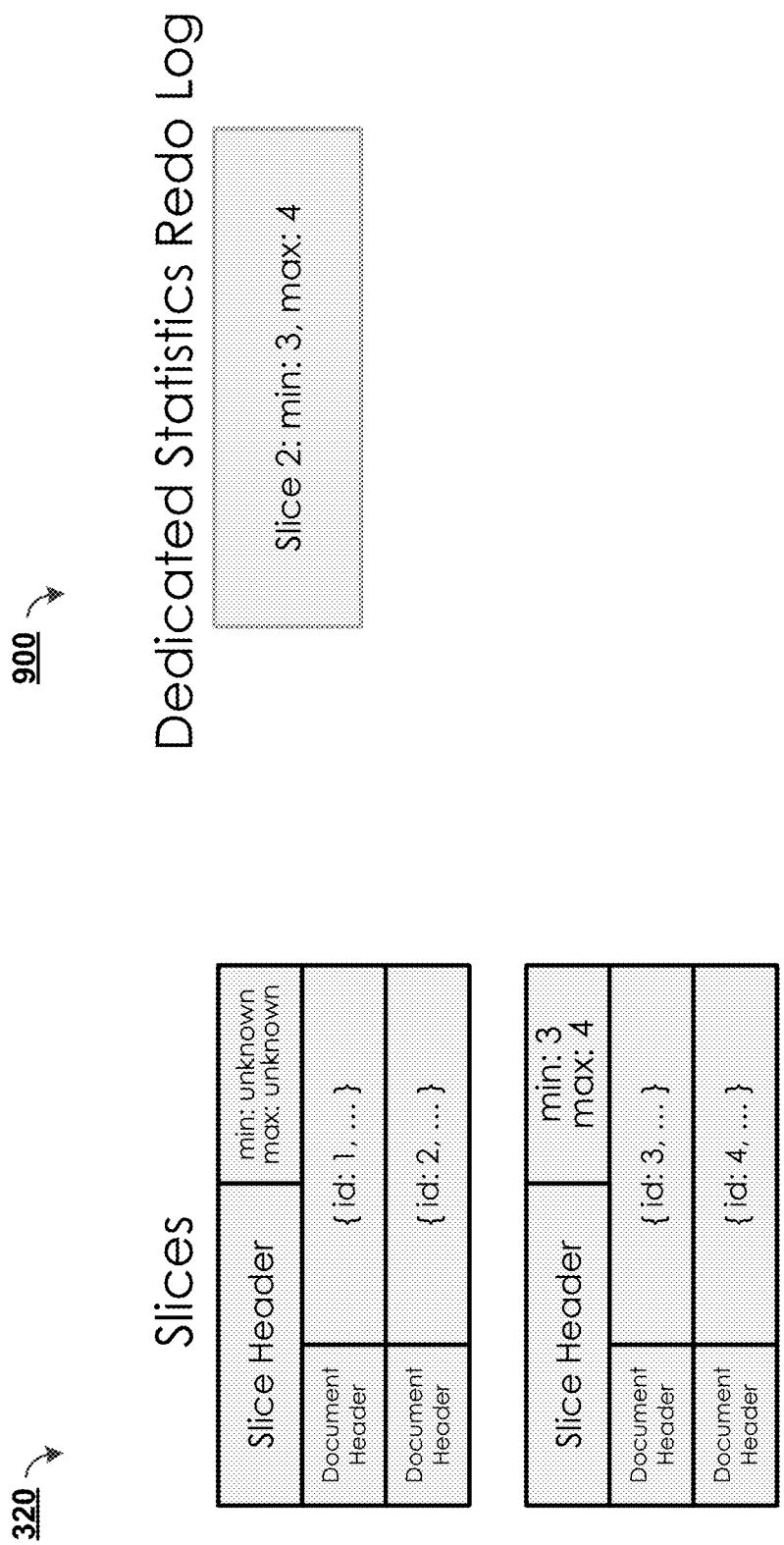
FIG. 9 is a functional block diagram of a portion of the slices of documents and a statistics log, in accordance with some embodiments.

FIG. 9 is a functional block diagram of a portion of the slices 320 of documents and a statistics log 900, in accordance with some embodiments. Similar to above, the slices 320 and/or documents within the slices can be analyzed, and statistics (e.g., minimums, maximums, etc.) about the documents and/or slices 320 can be stored within the dedicated statistics log 900. In some embodiments, the statistics log 900 can be created via an asynchronous process that considers full slices (e.g., without pending updates or the like). The statistics log 900 may be referenced during processing of queries (e.g., for pruning and/or execution of the query). Other modifications to this procedure may be made, as described herein (e.g., rounding minimums and maximums).

In some aspects, statistics can be written as a transaction into the statistics log 900. Use of the dedicated statistics log 900 can require less frequent or less complicated updates. In some aspects, the statistics log 900 can be stored separate from the slices 320 and/or the document store 120, and may be accessed independently through a separate stream. Doing so can free up resources for processing on the document store 120. Having a separate stream can allow the stream to be opened up independently from the stream for slices. The statistics can be comparably small in volume to the slices. Accordingly, in some embodiments, the statistics can be opened first, and thereafter, only slices determined to be relevant (or potentially relevant) are loaded into memory.

Figure 10:
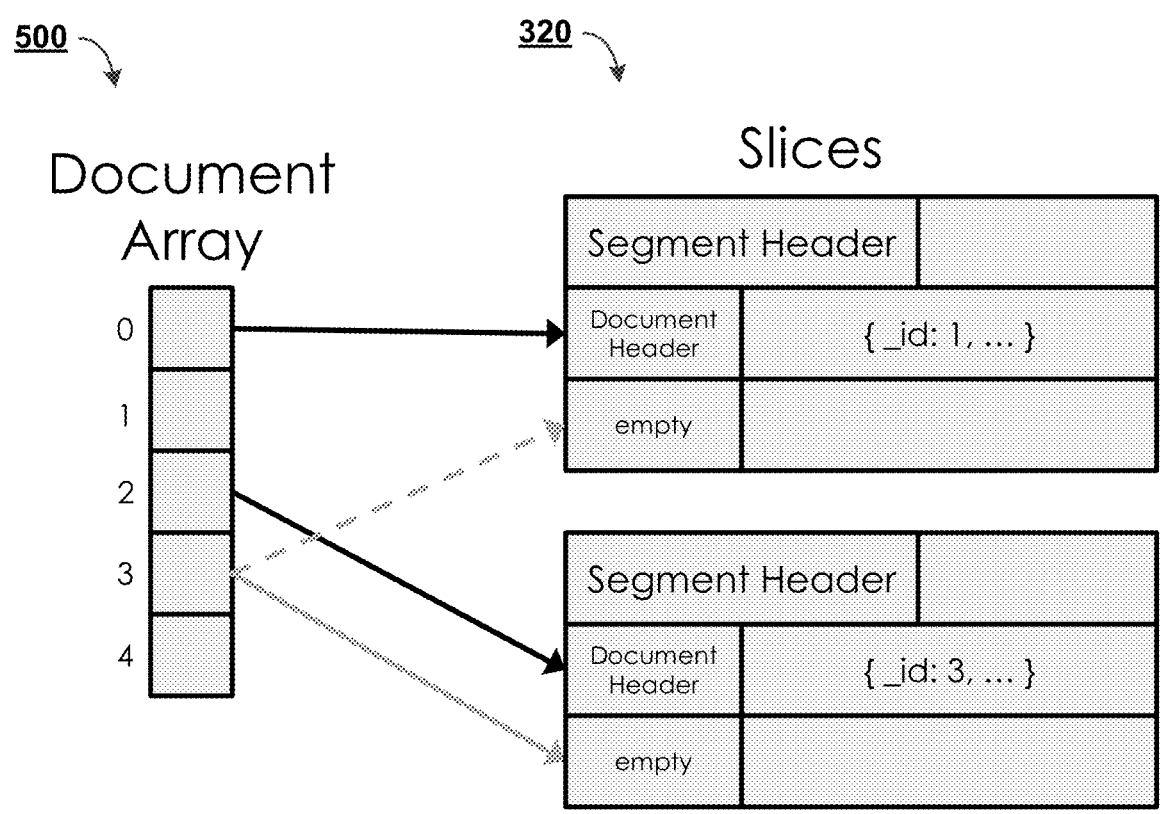
FIG. 10 is a functional block diagram of the document vector and a portion of the slices of documents, in accordance with some embodiments.

FIG. 10 is a functional block diagram of the indices 500 corresponding to a portion of the plurality of slices 320 of documents, in accordance with some embodiments. In some aspects, new documents might only be appended to the end of the slices 320, even when there is an available location somewhere earlier in the slices 320. Doing so can be beneficial where the id of the documents increases sequentially and/or creation dates of the documents are maintained. In order to decrease the space used to store documents, the slices 320 can be periodically merged in order to reduce the number of empty spaces. Merging can similarly occur upon the occurrence of an event, such as when one or more adjacent slices 320 have a threshold number of documents or empty spaces for documents.

Figure 11:
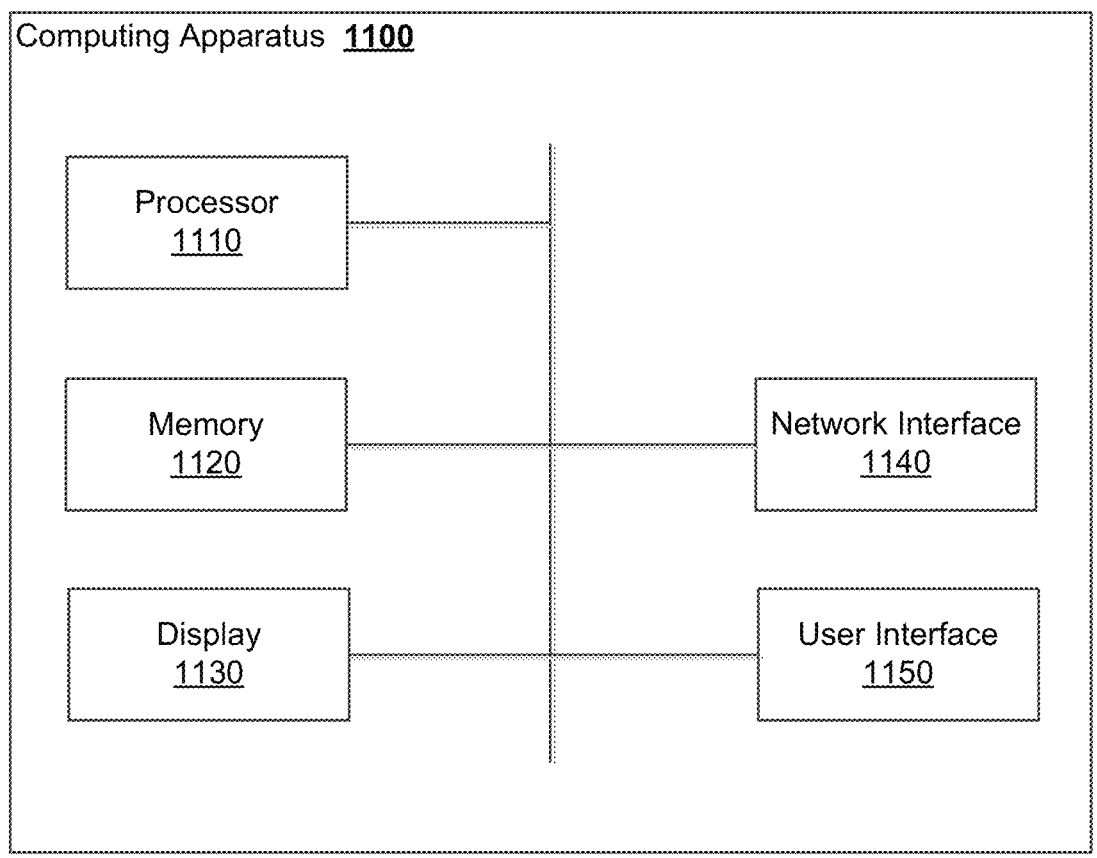
FIG. 11 is an illustration of a computing apparatus for processing documents for the document store, in accordance with some embodiments.

FIG. 11 is an illustration of a computing apparatus 1100 for processing documents for the document store, in accordance with some embodiments. An apparatus consistent with FIG. 11 may implement a user device 108, the computing system 102, the database management agent 112, and/or other related apparatuses. Computing apparatus 1100 may perform at least a portion of the processes described herein.

Computing apparatus 1100 may include one or more processors such as processor 1110 to execute instructions that may implement operations consistent with those described herein. Apparatus 1100 may include memory 1120 to store executable instructions and/or information. Memory 1120 may include solid-state memory, solid-state disk drives, magnetic disk drives, or any other information storage device. Memory 1120 may provide storage for at least a portion of a database. Apparatus 1100 may include a network interface 1140 to a wired network or a wireless network, such as the network 110 of FIG. 1. Wireless networks may include WiFi, WiMax, and cellular networks (2G/3G/4G/5G), and/or any other wireless network. Apparatus 1100 may include one or more user interface, such as user interface 1150. The user interface 1150 can include hardware or software interfaces, such as a keyboard, mouse, or other interface that may include a touchscreen integrated with a display 1130.

Figure 12:
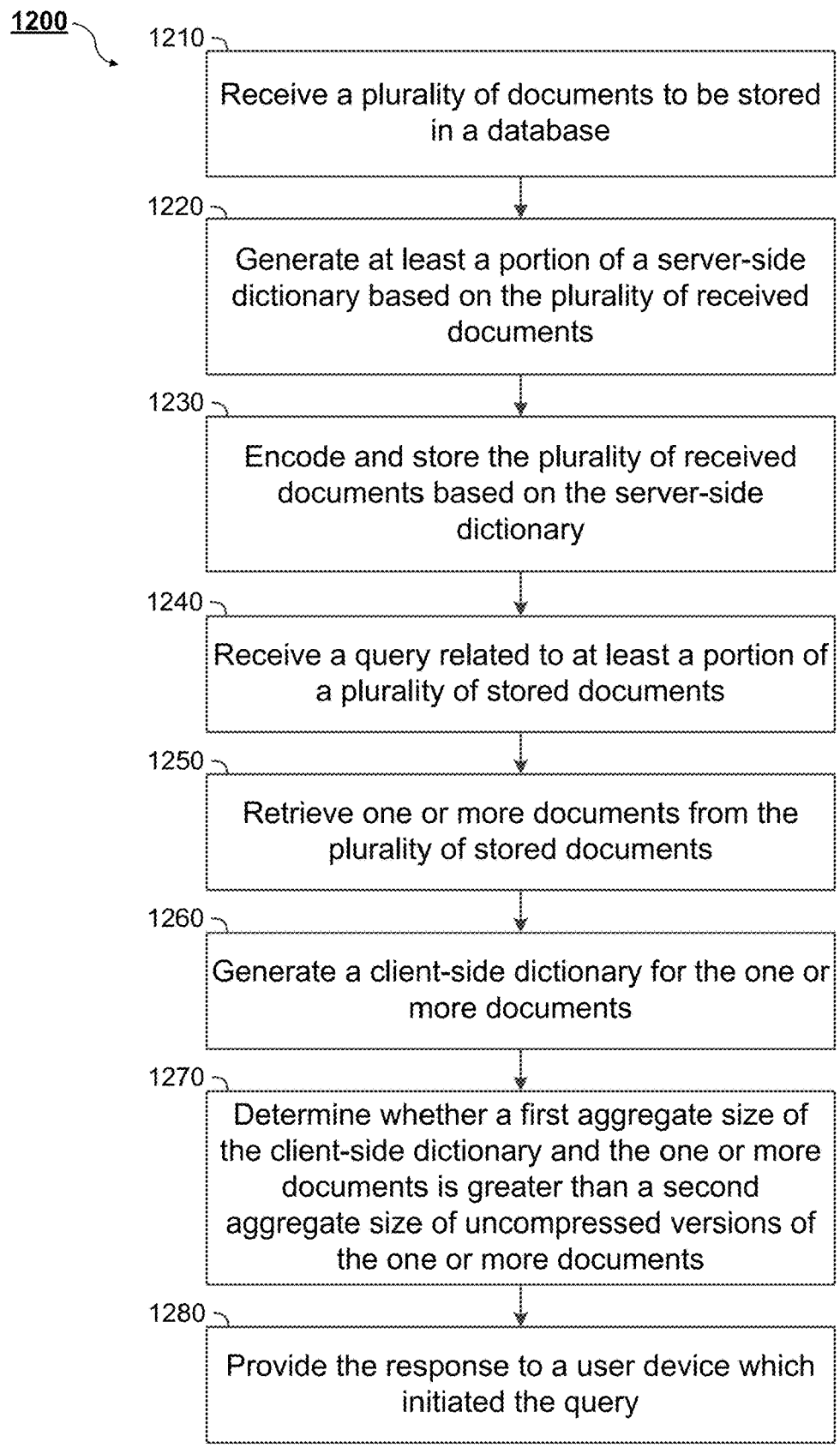
FIG. 12 is a flowchart of a method for encoding and/or decoding documents for the document store, in accordance with some embodiments.

FIG. 12 is a flowchart of a method 1200 for encoding and/or decoding documents for the document store, in accordance with some embodiments. In various embodiments, the method 1200 (or at least a portion thereof) may be performed by one or more of a database server, the apparatus 1100, a user device 108, the computing system 102, the database management agent 112, and/or other related apparatuses. In some aspects, the apparatus 1100 may be regarded as a server.

Method 1200 can start at operational block 1210 where the apparatus 1100, for example, receives a plurality of documents to be stored in a database. In some aspects, the plurality of stored documents can be stored in a document storage collection. In various embodiments, the plurality of stored documents are binary representations of JavaScript Object Notation (JSON) documents (e.g., PJSON documents). Method 1200 can proceed to operational block 1220 where the apparatus 1100, for example, generates at least a portion of a server-side dictionary based on the plurality of received documents.

Method 1200 can proceed to operational block 1230 where the apparatus 1100, for example, encodes and/or stores the plurality of received documents based on the server-side dictionary. For example, plurality of encoded documents can be generated, where the plurality of encoded documents are encoded to include a plurality of reference values defined in the server-side dictionary, in place of at least a portion of the plurality of parameters. In some embodiments, the plurality of encoded documents can be stored in a document storage collection of the database.

Method 1200 can proceed to operational block 1240 where the apparatus 1100, for example, receives a query related to at least a portion of a plurality of stored documents. Method 1200 can proceed to operational block 1250 where the apparatus 1100, for example, retrieves one or more documents from the plurality of stored documents (e.g., based on the query). In various embodiments, the one or more documents can be encoded based on a dictionary, such that a client device can decode the one or more documents based on the dictionary. For example, in some aspects, the plurality of stored documents can be encoded to include, in place of at least a portion of the plurality of parameters, a plurality of reference values defined in the dictionary. In turn, using the dictionary, the client device can decode the one or more encoded documents by replacing the one or more reference values with the corresponding parameters defined in the dictionary. Thereafter, the client device can use the one or more documents.

Method 1200 can proceed to operational block 1260 where the apparatus 1100, for example, generates a client-side dictionary for the one or more documents. In some embodiments, the client-side dictionary can include the server-side dictionary (or a portion thereof), and/or may be generated based on the server-side dictionary. Although the client-side dictionary and/or the server-side dictionary can be generated at any point in time, in some implementations, the server-side dictionary contains the leading/controlling definitions for the database/document store, and/or the client-side dictionary is a snapshot of the server-side dictionary (taken before and/or when it is necessary for transmission to a client). In some aspects, the client-side dictionary can include a plurality of definitions corresponding to a plurality of parameters from the plurality of stored documents, where each of the plurality of definitions includes a reference value and a corresponding parameter from the plurality of parameters.

Method 1200 can proceed to operational block 1270 where the apparatus 1100, for example, determines whether a first aggregate size of the client-side dictionary and the one or more documents is greater than a second aggregate size of uncompressed versions of the one or more documents. Additionally or alternatively, in some embodiments, versioning can be used for client-side dictionaries, and the method 1200 can involve the apparatus 1100, for example, determining whether a current version of the client-side dictionary which the client has is up-to-date. If not, the apparatus 1100 can provide an update to the client (e.g., the entire server-side dictionary, a portion thereof, or information on differences between the version which the client has access to and the current/updated version).

Method 1200 can proceed to operational block 1280, the apparatus 1100, for example where provides the response to a user device which initiated the query. In some aspects, the compressed versions of the one or more documents can be provided along with the client-side dictionary as part of a response to the query. In some embodiments, the compressed versions of the one or more documents can be provided along with the client-side dictionary as part of a response to the query when the first aggregate size is less than or equal to the second aggregate size. In similar embodiments, the uncompressed versions of the one or more documents can be provided as part of a response to the query when the first aggregate size is greater than the second aggregate size. In some aspects, the response to the query can be provided over a network or other connection to the user device.

As a non-limiting example of a benefit of the various implementations described, processing time/requirements and/or storage requirements on the part of the computing system 102 and/or the user device 108 can be reduced.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
   at least one data processor; and
   at least one memory storing instructions which, when executed by the at least one data processor, cause operations comprising:
   receiving, at a database server and from a user device, a database query related to at least a portion of a plurality of stored documents;
   retrieving, by the database server and based on the database query, one or more documents from the plurality of stored documents;
   generating, by the database server, a server-side dictionary for the one or more documents, wherein the server-side dictionary includes a plurality of content from the plurality of stored documents, and wherein each of the plurality of content is mapped to a reference value identifying a corresponding content contained in the plurality of stored documents to encode and/or decode, the server-side dictionary further including a slice identifier identifying a slice storing at least a portion of the corresponding content and, for each of the plurality of content, a range of values for the corresponding content to enable searching the range of values rather than the database server;
   generating, based on the server-side dictionary, a client-side dictionary;
   determining, by the database server, whether a first size of the client-side dictionary and the one or more documents is greater than a second size of uncompressed versions of the one or more documents; and
   in response to the first size not being greater than the second size, providing, by the database server and in response to the database query, the generated client-side dictionary for the one or more documents to the user device.

2. The system of claim 1, wherein the plurality of stored documents are encoded based on the client-side dictionary, and wherein the plurality of stored documents are encoded to include, in place of at least a portion of the plurality of content, a plurality of reference values defined in the client-side dictionary.

3. The system of claim 1, wherein the operations further comprise:
   receiving, at the database server, a plurality of documents to be stored in a database;
   generating, at a database server, at least a portion of the server-side dictionary based on the plurality of received documents;
   encoding, at the database server, the plurality of received documents based on the server-side dictionary to generate a plurality of encoded documents, wherein the plurality of encoded documents are encoded to include, in place of at least a portion of the plurality of content, a plurality of reference values defined in the server-side dictionary; and
   storing, by the database server, the plurality of encoded documents in a document storage collection of the database, wherein the client-side dictionary is generated based on the server-side dictionary.

4. The system of claim 1, wherein the operations further comprise:
   determining, by the database server, whether a first size of the client-side dictionary and the one or more documents is greater than a second size of uncompressed versions of the one or more documents; and
   providing, by the database server, the uncompressed versions of the one or more documents in response to the database query in response to the first size being greater than the second size.

5. The system of claim 1, wherein providing the client-side dictionary and the one or more documents comprises providing the client-side dictionary and the one or more documents over a network to a user device which initiated the database query.

6. The system of claim 1, wherein the plurality of stored documents are stored in a document storage collection.

7. The system of claim 1, wherein the plurality of stored documents are binary representations of JavaScript Object Notation (JSON) documents.

8. A method comprising:
receiving, at a database server and from a user device, a database query related to at least a portion of a plurality of stored documents;
retrieving, by the database server and based on the database query, one or more documents from the plurality of stored documents;
generating, by the database server, a server-side dictionary for the one or more documents, wherein the server-side dictionary includes a plurality of content from the plurality of stored documents, and wherein each of the plurality of content is mapped to a reference value identifying a corresponding content contained in the plurality of stored documents to encode and/or decode, the server-side dictionary further including a slice identifier identifying a slice storing at least a portion of the corresponding content and, for each of the plurality of content, a range of values for the corresponding content to enable searching the range of values rather than the database server;
generating, based on the server-side dictionary, a client-side dictionary;
determining, by the database server, whether a first size of the client-side dictionary and the one or more documents is greater than a second size of uncompressed versions of the one or more documents; and
in response to the first size not being greater than the second size, providing, by the database server and in response to the database query, the generated client-side dictionary for the one or more documents to the user device.

9. The method of claim 8, wherein the plurality of stored documents are encoded based on the client-side dictionary, and wherein the plurality of stored documents are encoded to include, in place of at least a portion of the plurality of content, a plurality of reference values defined in the client-side dictionary.

10. The method of claim 8, further comprising:
receiving, at the database server, a plurality of documents to be stored in a database;
generating, at a database server, at least a portion of the server-side dictionary based on the plurality of received documents;
encoding, at the database server, the plurality of received documents based on the server-side dictionary to generate a plurality of encoded documents, wherein the plurality of encoded documents are encoded to include, in place of at least a portion of the plurality of content, a plurality of reference values defined in the server-side dictionary; and
storing, by the database server, the plurality of encoded documents in a document storage collection of the database, wherein the client-side dictionary is generated based on the server-side dictionary.

11. The method of claim 8, further comprising:
determining, by the database server, whether a first size of the client-side dictionary and the one or more documents is greater than a second size of uncompressed versions of the one or more documents; and
providing, by the database server, the uncompressed versions of the one or more documents in response to the database query in response to the first size being greater than the second size.

12. The method of claim 8, wherein providing the client-side dictionary and the one or more documents comprises providing the client-side dictionary and the one or more documents over a network to a user device which initiated the database query.

13. A non-transitory computer program product storing instructions which, when executed by at least one hardware data processors, cause operations comprising:
receiving, at a database server and from a user device, a database query related to at least a portion of a plurality of stored documents;
retrieving, by the database server and based on the database query, one or more documents from the plurality of stored documents;
generating, by the database server, a server-side dictionary for the one or more documents, wherein the server-side dictionary includes a plurality of content from the plurality of stored documents, and wherein each of the plurality of content is mapped to a reference value identifying a corresponding content contained in the plurality of stored documents to encode and/or decode, the server-side dictionary further including a slice identifier identifying a slice storing at least a portion of the corresponding content and, for each of the plurality of content, a range of values for the corresponding content to enable searching the range of values rather than the database server;
generating, based on the server-side dictionary, a client-side dictionary;
determining, by the database server, whether a first size of the client-side dictionary and the one or more documents is greater than a second size of uncompressed versions of the one or more documents; and
in response to the first size not being greater than the second size, providing, by the database server and in response to the database query, the generated client-side dictionary for the one or more documents to the user device.

14. The non-transitory computer program product of claim 13, wherein the plurality of stored documents are encoded based on the client-side dictionary, and wherein the plurality of stored documents are encoded to include, in place of at least a portion of the plurality of content, a plurality of reference values defined in the client-side dictionary.

15. The non-transitory computer program product of claim 13, wherein the operations further comprise:
receiving, at the database server, a plurality of documents to be stored in a database;
generating, at a database server, at least a portion of the server-side dictionary based on the plurality of received documents;
encoding, at the database server, the plurality of received documents based on the server-side dictionary to generate a plurality of encoded documents, wherein the plurality of encoded documents are encoded to include, in place of at least a portion of the plurality of content, a plurality of reference values defined in the server-side dictionary; and
storing, by the database server, the plurality of encoded documents in a document storage collection of the database, wherein the client-side dictionary is generated based on the server-side dictionary.

16. The non-transitory computer program product of claim 13, wherein the operations further comprise:
- determining, by the database server, whether a first size of the client-side dictionary and the one or more documents is greater than a second size of uncompressed versions of the one or more documents; and
- providing, by the database server, the uncompressed versions of the one or more documents in response to the database query in response to the first size being greater than the second size.

17. The non-transitory computer program product of claim 13, wherein providing the client-side dictionary and the one or more documents comprises providing the client-side dictionary and the one or more documents over a network to a user device which initiated the database query.

* * * * *